Dec. 30, 1924.

J. W. WHITE 1,520,736

DISK WHEEL

Filed Nov. 24, 1922

Inventor

JOHN W. WHITE

BY Clarence S. Walker
His Attorney

Patented Dec. 30, 1924.

1,520,736

UNITED STATES PATENT OFFICE.

JOHN W. WHITE, OF BUFFALO, NEW YORK.

DISK WHEEL.

Application filed November 24, 1922. Serial No. 603,077.

*To all whom it may concern:*

Be it known that I, JOHN W. WHITE, a citizen of the United States, residing at 122 Bedford Avenue, Buffalo, in the county of Erie and State of New York, have invented certain new and useful Improvements in Disk Wheels, of which the following, taken in connection with the accompanying drawings, is a specification.

This invention relates to an improvement in disk wheels and more particularly in the means for assembling the wheel and for assuring the unitary movement of the various elements.

One object of this invention is to provide a single nut for securing the disk upon the inner hub in contradistinction to the plurality of nuts or bolts previously used for this purpose.

A further object of the invention is the provision of a plurality of corrugations in the inner hub with which corrugations a similarly corrugated periphery of the disk engages.

Other objects will appear from a consideration of the following description taken in connection with the drawing which forms a part hereof and in which—

Figure 1:
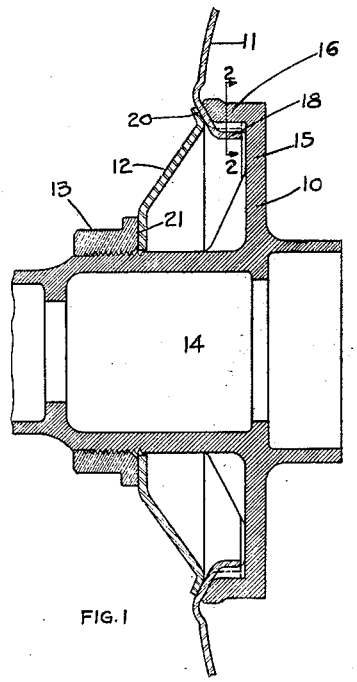
Fig. 1 is a cross section of the hub portion of a disk wheel embodying this invention.

Referring to the drawings, the reference number 10 is used to designate the inner hub of the wheel on which is mounted a disk 11, held in place by means of a shell 12 which in turn is secured by means of the nut 13 threaded upon the outer end of the inner hub. The central portion of the inner hub 10 is made hollow in the usual manner to receive the vehicle axle which carries the wheel and which is not shown in the drawing because it forms no part of this invention.

The inner hub 10 has a radial flange 15, at the periphery of which is formed a flange 16 at right angles to the flange 15 and parallel to the main portion of the inner hub. The under face of the flange 16 is provided with a series of equally spaced depressions 17, as shown for example in Figure 2. The outer edge of the portion 16 is slightly rounded for a purpose to be described later.

The disk 11 has a central opening so that it can be slipped over the hub into engagement with the inner flange 15. The periphery of the disk around the opening is provided with a flange 18 which bears upon the flange 16 of the hub and is corrugated similarly thereto so that when the parts are assembled as shown in the drawings the expressions 19 of the disk flange 18 will enter the depressions 17 of the flange 16 thus preventing any relative rotation between the parts.

The shell 12 is flanged at 20 to bear against disk 11 and flanged at 21 to receive the inner face of the nut 13, thus by tightening the nut 13 the shell is forced against the disk 11 and holds it firmly in contact with the rounded portion of the flange 16. If desired the shell 12 may be permanently fixed to the disk 11 and since these parts have a united action they may be referred to as the disk elements.

Since the edge of the flange 16 is rounded the disk 11 will be permitted to oscillate laterally without interference with the mounting. Thus any rigidly clamping of the disk to the inner hub and consequent fatigue of the metal at that point will be eliminated and the disk be free to weave without constriction throughout its entire surface.

The flange 18 of the disk lies under the flange 16 of the hub so that the latter and consequently the entire weight of the vehicle is supported from the upper part of the wheels thus placing this wheel in the class of suspension or tension wheels.

Figure 2:
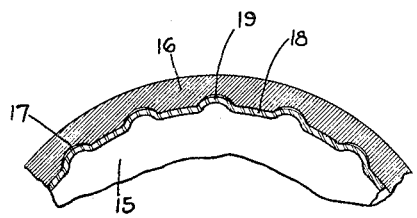
Fig. 2 is a section taken along the line 2—2 of Fig. 1.
Figure 3:
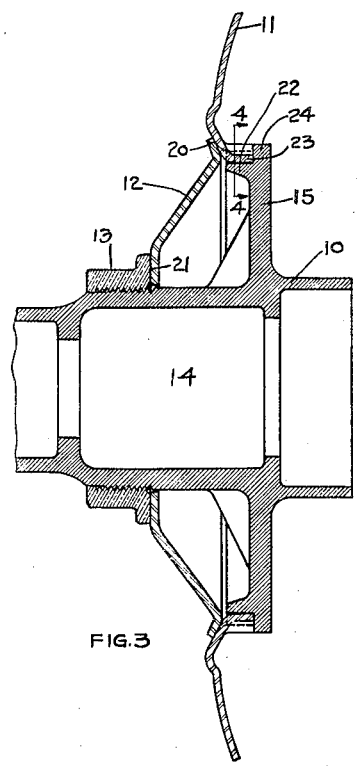
Fig. 3 is a view similar to Fig. 1 of another embodiment of this invention.
Figure 4:
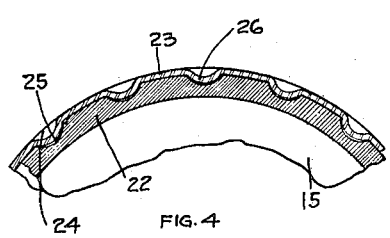
Fig. 4 is a cross section taken along the line 4—4 of Fig. 3.

The form shown in Figures 3 and 4 differs from that shown in Figures 1 and 2 merely in the manner in which the driving connection is provided between the disk and the inner hub. Consequently the reference characters used in Figures 1 and 2 will be used in Figures 3 and 4 wherever possible and only the differences between these embodiments will be described in detail.

The flange 15 of the inner hub 10 is provided with an annular flange 22 against which rests the inner periphery 23 of the disk 11. At the joinder of the flanges 22 and 15 there is on the flange 15 a shoulder 24 against which the inner edge of the disk rests. The upper face of the flange 22 is provided with a series of depressions 25 and the periphery 23 of disk 11 is provided with a similarly spaced series of expressions 26 so that when assembled, the parts will assume the position shown in Figure 4.

The shell 12 of the wheel bears against the outer face of the disk 11 and forces it into close contact with the shoulder 24. However, due to the fact that the disk is not held between the shell 12 and any rigid member as in Figure 1, the disk will be absolutely free to weave. Since the inner hub rests upon the disk flange the wheel may be said to be of the compression type the weight being supported by the lowest portion of the disk.

Obviously therefore, this second embodiment is in certain respects more flexible than in the first embodiment. Due however to the provision of the shoulder 24, the disk is held firmly in position upon the flange 22 and by reason of the depressions 25 and expressions 26 is caused to move as a unit with the inner hub.

While two embodiments have been shown and described, I am not to be limited thereby since it is obvious that other embodiments may be made without departing from the spirit and scope of my invention as set forth in the following claims.

Having thus set forth my invention what I claim as new and for which I desire the protection of Letters Patent is—

1. In a disk wheel the combination of a hub, a radial flange thereon, an annular flange projecting from said radial flange, one face of said annular flange being provided with corrugations, a disk having an inner peripheral flange corrugated conversely to said annular flange such corrugated surfaces being in mesh when the wheel is assembled and means for holding said disk and hub assembled.

2. In a disk wheel of the type set forth in claim 1, the holding means there recited being carried by said hub.

3. In a disk wheel of the type set forth in claim 1 the holding means there recited comprising a shell bearing upon said disk and a nut carried by said hub locking said shell against said disk.

4. In a disk wheel of the type set forth in claim 1 the annular flange there recited being corrugated upon its under face.

5. In a disk wheel, an inner hub having a radial flange and an annular flange at the periphery of said radial flange, a disk having a central opening and a corrugated flange surrounding said opening, and bearing upon said inner hub, corrugations on said inner hub meshing with said disk corrugations when the wheel is assembled, a shell clamping said disk against said annular flange and a nut carried by said inner hub for holding said shell in position.

In testimony whereof I affix my signature.

JOHN W. WHITE.